(12) United States Patent
Tabler et al.

(10) Patent No.: US 6,195,605 B1
(45) Date of Patent: Feb. 27, 2001

(54) IMPACT MONITOR

(75) Inventors: Lyle Tabler; H. Jay Kellam, both of Calgary (CA)

(73) Assignee: BMI Technologies Inc., Calgary (CA)

( * ) Notice: Subject to any disclaimer, the term of this patent is extended or adjusted under 35 U.S.C. 154(b) by 0 days.

(21) Appl. No.: 09/407,290

(22) Filed: Sep. 29, 1999

(51) Int. Cl.[7] .................................................. B60Q 1/00
(52) U.S. Cl. ................................ 701/50; 701/35; 340/436
(58) Field of Search .................... 701/50, 35; 340/436, 340/438, 437, 426, 429

(56) References Cited

U.S. PATENT DOCUMENTS

| | | | | |
|---|---|---|---|---|
| 3,940,999 | * | 3/1976 | Nonaka et al. | 73/514.09 |
| 5,058,044 | * | 10/1991 | Stewart et al. | 702/184 |
| 5,235,320 | * | 8/1993 | Romano | 340/539 |
| 5,374,918 | * | 12/1994 | Tharbs | 340/438 |
| 5,774,044 | * | 6/1998 | Hayashi | 340/426 |
| 5,802,545 | * | 9/1998 | Coverdill | 701/35 |
| 5,805,056 | * | 9/1998 | Mueller et al. | 340/426 |
| 5,818,329 | * | 10/1998 | Allen | 340/426 |
| 5,955,942 | * | 9/1999 | Slifkin et al. | 340/436 |

FOREIGN PATENT DOCUMENTS

2499536 * 8/1982 (FR) .

* cited by examiner

Primary Examiner—Michael J. Zanelli
Assistant Examiner—Eric M Gibson
(74) Attorney, Agent, or Firm—Adrian D. Battison

(57) ABSTRACT

An impact monitoring device is provided for mounting on a vehicle for monitoring any impacts the vehicle incurs. The device includes a main housing to be mounted below the vehicle's console. An impact sensing element is mounted on the vehicle remotely from the main housing and includes an accelerometer therein which produces an impact signal representing a magnitude of acceleration. The impact signal is received by a microprocessor mounted within the main housing. An operator interface is mounted on the vehicle's console remotely from the main housing. The operator interface receives coded signals from the operator and transmits the coded signals to the microprocessor for programming and instructing the microprocessor on how to process the impact signals. If an impact signal is received by the microprocessor which exceeds a predetermined impact threshold, an alarm state is activated. The alarm state activates an audio alarm and disables the vehicle until a coded disarming signal is received by the operator interface.

20 Claims, 14 Drawing Sheets

IMPACT MONITOR

FIELD OF THE INVENTION

This invention relates to an impact monitoring device for mounting on a vehicle for monitoring impacts the vehicle incurs.

BACKGROUND

Products are frequently shipped and handled by various types of product handling vehicles including trucks and forklifts. These vehicles are often subject to considerable operator abuse when used in unsupervised areas. The resulting damage from collisions to the vehicles and product being shipped can be costly and time consuming to repair.

One known prior art device includes an accelerometer and a microprocessor arranged to mount on a vehicle used for handling product for producing an audible alarm when the vehicle incurs an impact. The device however is disarmed by a simple key which may be duplicated. The device does not disable the vehicle or deter anyone from disabling the device itself thus making the device an ineffective way of determining who is responsible for an impact which has caused damage to the product being handled. The alarm of the device is dependent upon comparison of the accelerometer output to a single impact threshold value. The device thus cannot record soft impacts of relatively short magnitude and long duration in addition to hard impacts of relatively large magnitude and short duration, both of which can result in significant damage to either the vehicle or the product being shipped.

SUMMARY

According to one aspect of the present invention there is provided an impact monitoring device for mounting on a vehicle for monitoring impacts the vehicle incurs, the device comprising:

an impact sensing element arranged to produce an impact signal in response to an acceleration condition incurred by the vehicle which is outside of a range of acceleration conditions, the impact signal representing the acceleration condition;

a processor connected to the impact sensing element and including;

an alarm activator for activating an alarm state in response to receipt by the processor of an impact signal from the impact sensing element;

an alarm latch for latching the alarm state; and an alarm release for releasing the alarm in response to receipt by the processor of a disarming signal;

an operator interface mounted on the vehicle, the operator interface being arranged for receiving the disarming signal and transmitting the disarming signal to the alarm release; and a disabling element for disabling a function of the vehicle during the alarm state.

The acceleration condition may be as simple as the magnitude of an acceleration experienced by the vehicle or it may be more complex including other factors for example the duration of the acceleration or jerk which is the rate of change of acceleration.

The disabling element does not allow the vehicle's operator to continue operating the vehicle until a supervisor provides the disarming signal for releasing the alarm state. This is effective for determining when a collision or impact has occurred and who is responsible for it.

There may be provided a horn relay connected to the processor, the horn relay being activated by the processor during the alarm state for sounding the horn. A relay monitor is preferably connected to the horn relay, the relay monitor being arranged to activate the alarm state if the horn circuit is disconnected.

The vehicle may comprise a lift vehicle wherein the disabling element is connected to a lift solenoid of the lift vehicle such that the lift solenoid is disabled during the alarm state.

A power circuit is preferably arranged to be connected between the processor and a battery of the vehicle for supplying continuous power to the processor. There may be provided a power circuit monitor connected to the processor such that the alarm activator is arranged to activate the alarm state in response to an absence of power if the power circuit is disconnected.

A memory element may be connected to the processor, the memory element being arranged to store impact signals thereon.

There may be provided a vehicle identification element connected to the microprocessor, the vehicle identification element being arranged to store an identification of the vehicle in the memory element with each impact signal.

Preferably there is provided a clock element connected to the memory element, the clock element being arranged to store a time corresponding to each impact signal in the memory element.

An alarm delaying element is preferably provided for delaying activation of the alarm state for a predetermined amount of time following vehicle start up such that the vehicle is momentarily operable upon start up.

A digital storage element is preferably provided, the digital storage element being arranged to contact the operator interface for communicating therewith, the digital storage element having a coded element therein such that the digital storage element cannot be duplicated by unauthorised persons.

According to a second aspect of the present invention there is provided an impact monitoring device for mounting on a vehicle for monitoring impacts the vehicle incurs, the device comprising:

an impact sensing element arranged to produce an impact signal in response to an acceleration condition incurred by the vehicle which is outside of a range of acceleration conditions, the impact signal representing the acceleration condition;

a processor connected to the impact sensing element and including;

an alarm activator for activating an alarm state in response to receipt by the processor of an impact signal from the impact sensing element;

an alarm latch for latching the alarm state; and an alarm release for releasing the alarm state in response to receipt by the processor of a disarming signal;

an operator interface mounted on the vehicle, the operator interface being arranged for receiving the disarming signal and transmitting the disarming signal to the alarm release; and a digital storage element having the disarming signal stored thereon, the digital storage element being arranged to communicate with the operator interface for transmitting the disarming signal to the operator interface, the digital storage element having a coded element therein such that the digital storage element cannot be duplicated.

The digital storage element is a key which has encoded data recorded thereon. The coded element ensures that the digital storage element cannot be readily duplicated by unauthorised persons. The digital storage element enables authorised persons to record numerous different instructions thereon for programming numerous functions of the impact monitoring device.

The digital storage element preferably has a memory element therein for recording and storing data thereon.

There may also be provided a digital storage element having operator identification data recorded thereon, the digital storage element being arranged to communicate with the operator interface such that the operator identification data is stored with the impact signal when an alarm state is activated.

Additionally there may be provided a digital storage element having the predetermined impact value stored thereon for programming the processor when engaged with the operator interface.

A computer interface may be provided for communicating between the digital storage element and a computer for storing the impact signals recorded on the digital storage element into the computer.

According to a further aspect of the present invention there is provided a method of monitoring impacts incurred by a vehicle, said method comprising;

providing an impact sensing element mounted on the vehicle, the impact sensing element being arranged to produce an impact signal representing a magnitude of acceleration incurred by the vehicle at a given point in time;

providing microprocessor means for processing a plurality of impact signals;

calculating a sample representing an average of a plurality of impact signals;

calculating a hard impact average of at least two consecutive samples;

comparing the hard impact average to a predetermined hard impact value; and activating an alarm state if the hard impact average exceeds the predetermined hard impact value.

The method may also include:

calculating a soft impact average of a greater number of consecutive samples than the hard impact average;

comparing the soft impact average to a predetermined soft impact value which is less than the hard impact value in magnitude;

and activating the alarm state if the soft impact average exceeds the predetermined soft impact value.

The use of a hard impact value and a soft impact value enable the monitor to distinguish a hard impact of relatively large magnitude and short duration from a soft impact of relatively small magnitude and long duration. Both the hard impact and the soft impact correspond to collisions which can result in significant damage; however, the use of a single impact threshold value is not sufficient for recording all impacts which correspond to a collision resulting in significant damage. The use of both hard and soft impact values ensures that there will be fewer false readings or missed readings of an impact incurred by the vehicle.

The method may include calibrating the impact sensing element after each hard and soft impact averages are calculated.

The method may also include recalculating the soft impact average before comparing the soft impact average to the predetermined soft impact value for reducing the possibility of an incorrect soft impact average activating the alarm state resulting from surrounding noise.

BRIEF DESCRIPTION OF THE DRAWINGS

In the accompanying drawings, which illustrate an exemplary embodiment of the present invention.

DETAILED DESCRIPTION

Figure 1:
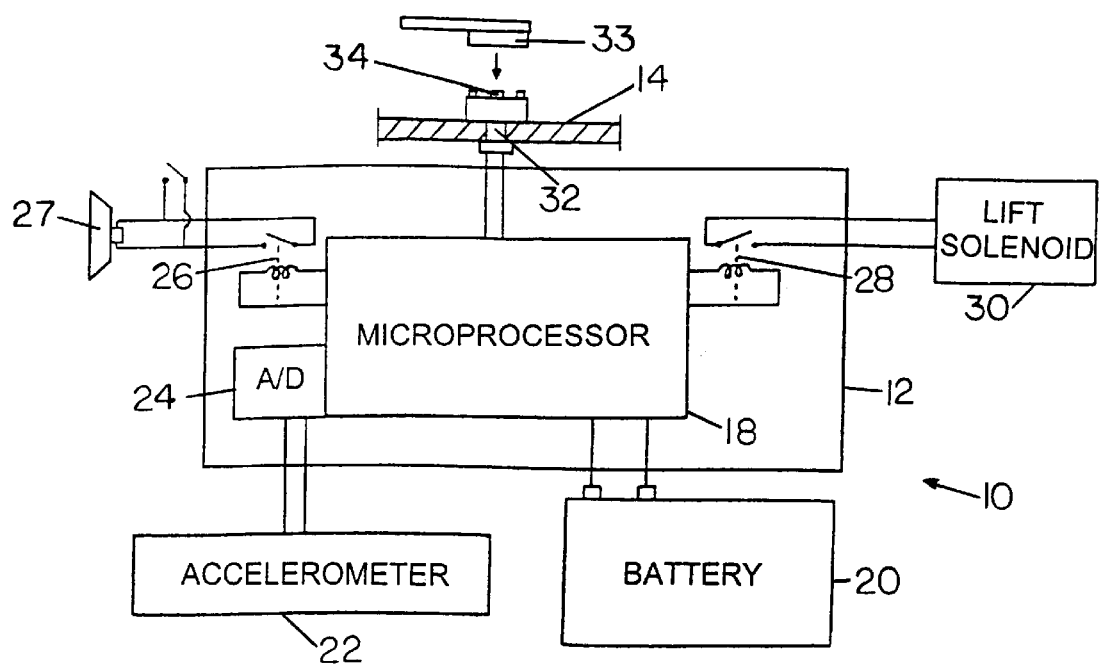
FIG. 1 is a schematic of the impact monitoring device as it is wired to the components of a forklift.

Referring to the accompanying drawings, there is illustrated an impact monitoring device generally indicated by reference numeral 10. The impact monitoring device 10 is for mounting on a vehicle for monitoring impacts or accelerations the vehicle incurs.

Figure 2:
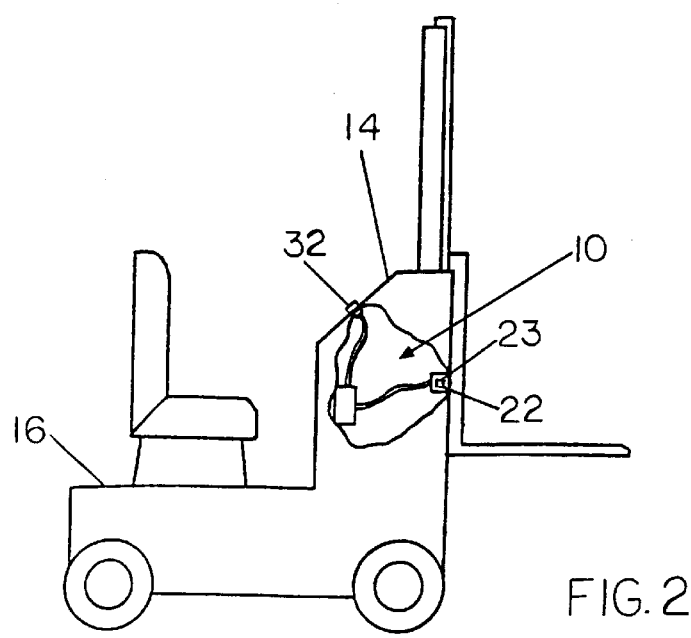
FIG. 2 is a side elevation view of a forklift in which the impact monitoring device is installed.

In FIG. 1, a first embodiment of the device 10 is shown schematically. The device 10 includes a main housing 12 mounted internally under a console 14 of a forklift 16 as shown in FIG. 2. The main housing 12 includes a processing unit 18 therein for controlling the operation of the device. The processing unit 18 is wired to the forklift's battery 20 for providing continuous power to the device.

With further reference to the Figures, an accelerometer 22 is mounted on a mount 23 on the forklift 16 remotely from the main housing 12. The accelerometer 22 may thus be mounted in a strategic location on the forklift for effectively sensing the desired acceleration forces the forklift endures during an impact. The accelerometer 22 produces an impact signal representing a magnitude of the acceleration forces the forklift incurs. The impact signal is received by an analogue to digital (A/D) converter 24. The A/D converter 24 transmits the impact signal to the processing unit 18.

The processing unit 18 activates an alarm state in response to an impact signal which is greater or less than a predetermined impact threshold value. The processing unit 18 includes an alarm activator for activating the alarm state, an alarm latch for latching the alarm state and an alarm release for releasing the alarm state in response to receipt by the processing unit of a disarming signal.

A first relay switch 26 is connected to the processing unit, such that the first relay switch 26 closes and opens in an alternating manner when the alarm state is activated. The first relay switch 26 is connected to the terminals of the forklift's horn 27 such that closing the first relay switch 26 will sound the horn. When the alarm state is activated the horn will sound on and off once per second according to the first relay switch 26.

A second relay switch 28 is connected to the processing unit such that the second relay switch 28 is closed until the alarm state is activated. When the alarm state is activated the second relay switch 28 is opened and remains open until the alarm state is deactivated. The second relay switch interrupts the forklift's lift solenoid circuit 30 such that the lift solenoid circuit is interrupted only when the alarm state is activated or the power supply to the processing unit is terminated. The forklift is thus deactivated if someone tampers with the device 10 by disconnecting the connections to the battery.

An operator interface 32 is connected to the processing unit 18. The interface 32 is mounted on the console 14 remotely from main housing such that the interface 32 is easily accessible while the main housing remains hidden from operator abuse. The interface 32 is arranged to communicate with digital storage keys 33 having encoded data digitally recorded thereon. The interface 32 is cylindrical having an upper flange for mounting adjacent a top face of the console 14 and a threaded nut on a bottom end for engaging bottom face of the console 14.

A pair of contacts on the operator interface are arranged to engage the digital storage keys 33 for transferring data therebetween. The keys 33 are commercially available storage elements known as Memory iButtons™. Key model numbers DS1992, DS1993 and DS1994, used in this exemplary embodiment of the present invention and published specification listings for the keys are available from Dallas Semiconductor Corporation of Dallas, Tex. Four main components form the key, the components being a 64-bit lasered ROM, a 256-bit scratchpad, a 1024-bit RAM and timekeeping registers. The keys communicate with the operator interface contacts through a pair of electrical key contacts using digital techniques for reading data from and writing data onto the keys.

A light emitting diode (LED) 34 is mounted on the interface 32 for communicating with the operator of the forklift. The LED is arranged to light up and flash in various patterns for indicating the various functions and states of the processing unit.

Figure 3:
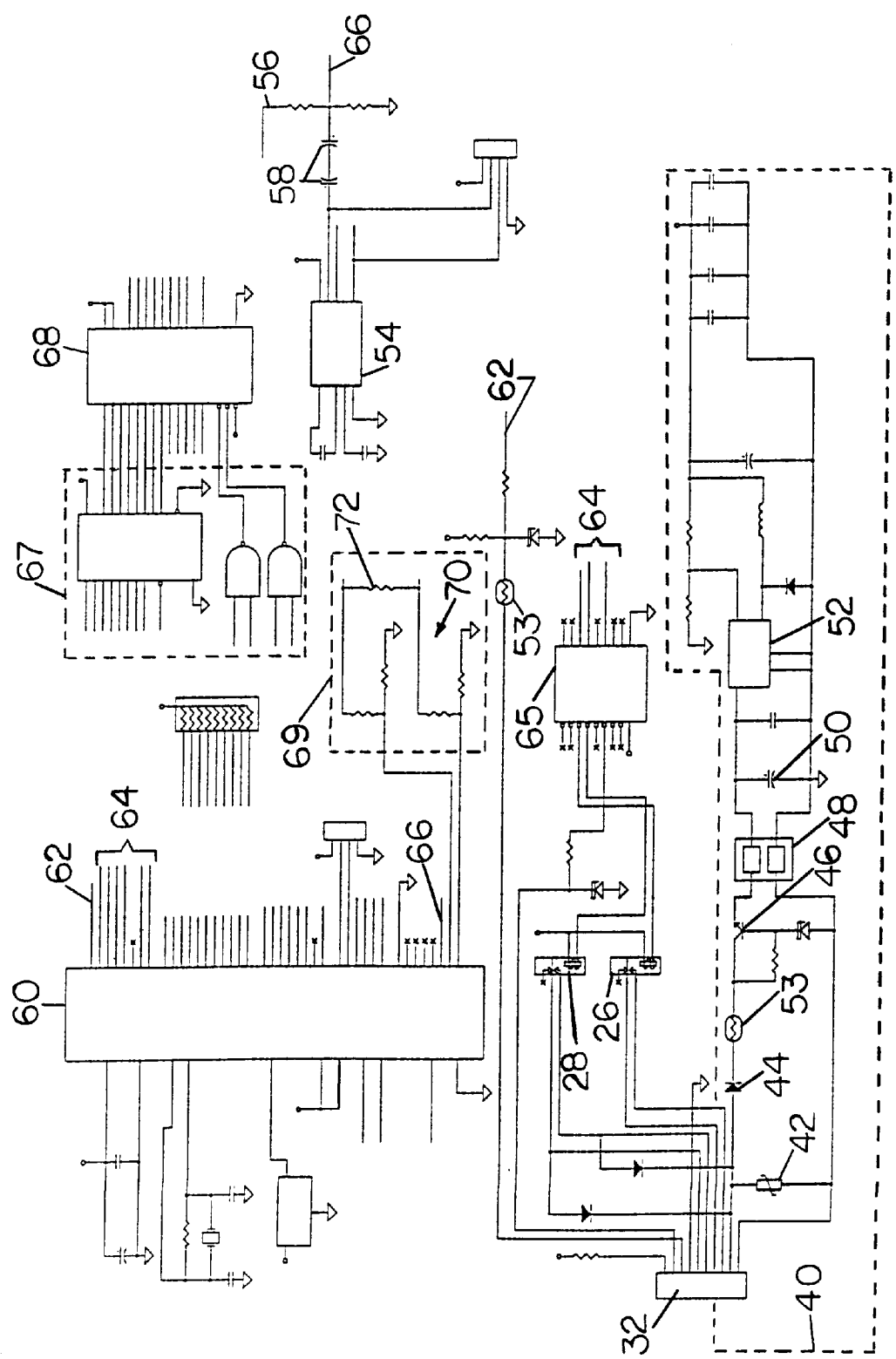
FIG. 3 is a schematic of the circuitry of a first embodiment of the impact monitoring device.

Referring to FIG. 3 a first embodiment of the internal circuitry of the main housing 12 is shown. A power supply circuit 40 is shown for supplying 5 volts of power to the rest of the circuitry. An MOV 42 provides a path to ground for high energy transients greater than 80 volts DC. Connected to the MOV is a diode 44 which provides reverse polarity protection to the power supply circuit. A transistor 46 is connected to the diode to act as a linear regulator to knock the input voltage down to approximately 32 volts DC which is below the rated voltage of the next stage. For inputs below 32 volts DC the transistor adds a voltage drop of about 1.4 volts. A transorb on the transistor's base provides the voltage reference as well as additional transient protection. A ferrite filter 48 and a capacitor 50 connected to the transistor 46 provide high frequency noise filtering. A switching regulator 52 receives inputs from the capacitor 50 for providing 5 volt power to the rest of the circuit.

A pair of polyswitches 53 are also included for protecting against transient signals. One of the polyswitches is mounted between the power circuit and the battery, while another polyswitch is mounted between the interface 32 and the remaining circuit. The polyswitches 53 act as a self resetting fuse which switch to high impedance when an unexpectedly high current is forced through the circuit for removing the load from the rest of the circuit and protecting it.

The accelerometer, indicated by reference numeral 54 in FIG. 3, is a micro-machined accelerometer with signal conditioning in an 8 pin DIP package. The output impact signal is approximately 35 millivolts per G of acceleration. The voltage output when 0 G's of acceleration is sensed is approximately 2 volts but can vary from sensor to sensor. External components were selected to set it's frequency response to approximately 10 Hz. An internal 3.40 volt reference is used as a reference for the A/D converter in the processing unit and as excitation for a voltage divider 56. The impact signal output from the accelerometer is coupled with capacitors 58 onto a centre tap of the voltage divider 56 and input into a microprocessor 60. The capacitor coupling removes the DC component of the signal so that accelerometer zero shifts become irrelevant. One percent resistors are used in the voltage divider 56 such that there could be a difference of up to 3 counts from G force to G force in the zero G reading made by the microprocessor out of a total of 256 counts. Using a 3.40 volt reference, each count corresponds to 13.3 millivolts (mV), thus each G of acceleration is equal to 2.64 counts.

The microprocessor, indicated by reference numeral 60 in FIG. 3, is a MC68HC11A1FN microprocessor. The microprocessor 60 provides 256 bytes of random access memory (RAM) to hold temporary variables and 512 bytes of EEPROM which stores passwords and setpoints. A serial port 62 on the microprocessor communicates with the operator interface 32 for reading the memory touch keys 33. Digital output lines 64 from the microprocessor 60 control the status of the LED 34 and the first and second relays 26 and 28 through an interface 65. An 8 megahertz crystal oscillator is the time-base for sampling the accelerometer input into the microprocessor through an input port indicated at 66. The microprocessor is programmed to restart if a malfunction is detected.

The program that controls the impact monitor is encoded in a one-time programmable read only memory (PROM) indicated by reference numeral 68. The microprocessor is programmed to sample the input from the accelerometer once every 0.5 milliseconds. Each sample is an average of 4 consecutive analogue/digital conversions. Since the A/D converter is an 8 bit converter, the sample is a number or count between 0 and 255 inclusive. The zero reading is approximately 128, but is modified by an autozero routine. The PROM 68 communicates with the microprocessor using an address decoder 67 connected to both the microprocessor and the PROM.

The autozero routine initially sets the zero G reading to 128 when the unit is powered on. The samples are continually monitored by the autozero routine for calibrating the zero G reading. If 4000 continuous samples are identical and more than 1 bit different from the current zero G reading, their value is averaged with the current value and that average becomes the new zero G reading. This routine sets the zero G reading to within one count. An autozero routine must be completed before the impact detection is enabled. Once the impact detection is enabled the autozero routine runs continuously.

The serial port 62 on the microprocessor which communicates with the operator interface reads data every 500 milliseconds. If one of three types of the digital storage keys 33 are detected in communication with the operator interface, appropriate action is taken. A first key or master key is used at the factory during assembly of the device. The master key downloads passwords required by the other two types of keys only if the master key's password stored in its memory matches a password stored in the PROM.

A second key or disarm key is used to deactivate the alarm state once it has been triggered by an impact signal which is greater than the predetermined impact value. The disarm key communicates with the operator interface and transmits a coded signal to the microprocessor which resets the unit and deactivates the alarm state. The coded signal must match a password stored on the PROM 68 in order for the microprocessor to accept the coded signal and deactivate the alarm state such that the disarm key cannot be duplicated without knowing the password stored on the PROM.

A third key or program key includes data stored thereon for programming the number of samples (NSAMP) to be taken and the predetermined impact value or acceleration threshold (GTHRESH) used by the impact detection process. The program key communicates with the operator interface and must transmit a coded signal which matches the password stored on the PROM 68 before the values of NSAMP and GTHRESH are accepted.

The impact detection process maintains a running sum of a previous number of samples designated by the variable NSAMP. If that sum exceeds a value calculated by the formula (NSAMP×GTHRESH) then the alarm state is activated. This is essentially an integration of acceleration over time. The moving sum is proportional to the work being done by the truck. The higher this sum, for a given vehicle mass, the more damage is being done. A lower value of GTHRESH is required for larger vehicles. The default setting of NSAMP is equal to 10. Typical settings of GTHRESH for a warehouse forklift are in the range of 1 to 8 G's of acceleration.

Detection of an impact causes a byte in the PROM to be set defining the alarm state. Only a valid key having the disarming signal encoded thereon will reset the byte. Disconnecting the power and resetting the unit has no effect on the alarm state. The program continuously monitors this alarm byte and controls the relays and the LED according to the state of the alarm byte.

A horn detection circuit 69 is provided for detecting if one or both horn wires have been cut in an attempt to deactivate the monitoring device. The voltage across the first relay contact is continuously monitored by the microprocessor A/D converter. Normally, the contact is open and one side will be at ground while the other at the vehicle's battery voltage. A resistor network 70 divides the voltages down to levels that the A/D converter can handle. High resistance values are required to protect the microprocessor from transients. If one or both of the horn wires becomes disconnected, resistor 72 will pull the contacts to the same voltage. If this is detected by the program for longer than 2 minutes, the alarm state is activated and the lift solenoid is disabled. The 2 minute period is chosen arbitrarily. The time period must only be longer than the maximum time for which an operator would sound the horn as this also puts the contacts at the same voltage.

The LED 34 is controlled by the microprocessor to indicate the status of the impact monitoring device. An LED which is lit without flashing indicates the initial autozero routine is running or the processor has malfunctioned. An LED which is not lit indicates a loss of power or a processor malfunction. A slowing flashing LED indicates that the device is functioning properly with no impact detected, thus the horn relay is open and the lift relay is closed. A rapidly flashing LED indicates an alarm state wherein the horn relay is closed and the lift relay is open. An LED which alternates between flashing and being turned off indicates that the horn wires have been cut and that the lift relay is open.

Figure 4:
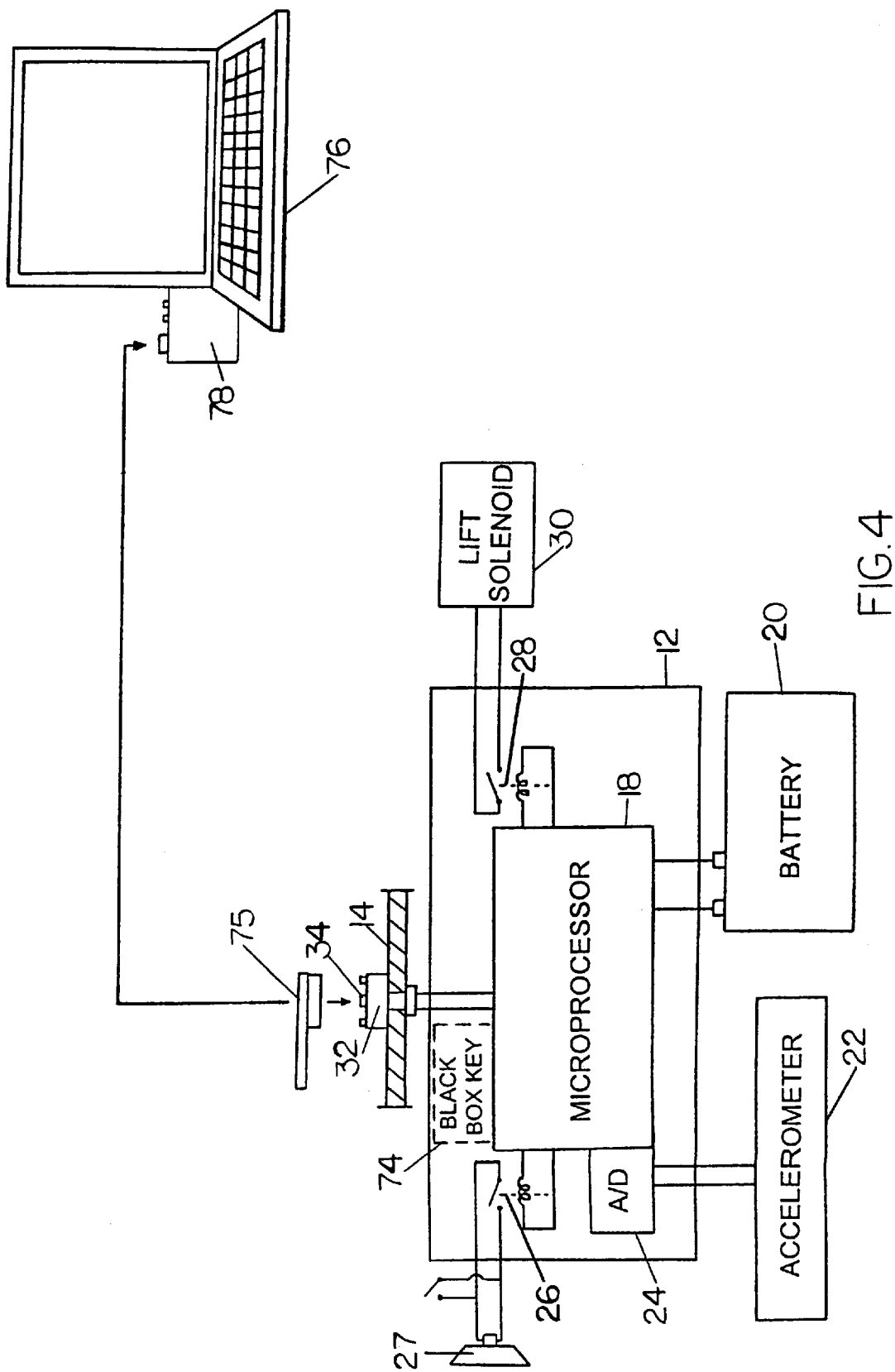
FIG. 4 is a schematic of a second embodiment of the impact monitoring device.

In a second embodiment shown in FIG. 4, the impact monitoring device 10 is similarly arranged as in the first embodiment; however the programming is more complex and is able to perform more functions. There is also provided more types of digital storage keys 33 which are capable of communicating with the operator interface 32 for providing some of the additional functions.

In the second embodiment, the impact monitoring device is arranged to operate in two modes. In a first mode, the device operates similarly to the first embodiment which is the default setting of the device; however, the semi-permanent installation of a black box key 74 within the main housing 12 of the device, will automatically cause the device to operate in a second mode.

The black box key 74 stores a vehicle identification code and an authorisation level code which is specific to each vehicle. The black box key also stores data relating to an impact event to be later downloaded. Impact event data includes operator identification, vehicle identification, vehicle authorisation level, time/date, and impact level of each event.

In the second mode of operation, the impact monitoring device operates just as it does in the first embodiment; however, the device also records the data relating to an impact event onto the black box key 74. Should the vehicle incur an impact which produces an acceleration which is greater than the predetermined impact value, the alarm state will be activated for sounding the horn and disabling the lift solenoid.

The use of a disarming key 75 will deactivate the alarm state and reset the device if an event has occurred. The disarming key 75 of the second embodiment is arranged to communicate with the operator interface 32 for transmitting a coded disarming signal to the device and includes a memory element for receiving data from the device regarding the last impact event which the vehicle had incurred. Each time the disarming key is used to disarm an alarm state, the event is recorded onto the key until it is full after a total of 42 events. After the key is full, the key is no longer able to disarm an alarm state and the data of the 42 events must be downloaded onto any conventional type computer. In the event the vehicle's power is turned off or cut, the memory circuits are safely stored including the alarm state. Turning the vehicle on and off, thus will not release the alarm state or erase anything including an impact signal stored in memory.

In order to download the data onto a computer 76, a key interface communication unit 78 is connected to the computer. The key interface communication unit 78 reads all the data from a disarming key 75 which engages its contacts and then clears the key's memory such that the key may be used again for disarming impact monitoring devices.

An operator key which is a digital storage key similar to the disarming key 75 is required to operate a vehicle which has an impact monitoring device with a black box key 74 installed thereon. The operator key communicates with the operator interface 32 and transmits an operator's identification and authorisation level data recorded thereon to the black box key. If the operator is authorised to use the vehicle the lift relay is energised, otherwise the vehicle remains disabled. The lift relay remains energised until the monitoring device is reset or until the alarm state is activated. If an alarm state has been activated, a disarming key must be used to deactivate the alarm state which resets the monitoring device such that the operator must use the operator key again to log back on.

The operator and vehicle identifications are stored as two digit numbers on the digital storage keys to save memory space. The authorisation level data is also stored in a two digit format according to vehicle class. Vehicle assigned authorisation codes 01 through to 10 require that the operator's authorisation level be greater than or equal to the vehicle's code in order for the operator to use the vehicle. Vehicle assigned authorisation codes 11 through to 98 require that the operator's authorisation level be equal to the vehicle's code in order to use the vehicle. An operator authorisation level of 99 allows the operator to override any other vehicle authorisation code and operate any vehicle. A vehicle with an authorisation code of 00 does not require an operator identification or authorisation level. Each operator key can store up to 48 vehicle identification codes and 12 vehicle authorisation codes such that the operator is authorised to use any vehicle that any one of these codes corresponds to.

Each digital storage key 33 or 75 in either the first or second embodiments, includes a type identification number which is permanently encoded on the key such that the microprocessor can identify what type of key is in communication with the operator interface and consequently communicate the appropriate data with the key. Following the type identification number is a 3-bit manufacturer's code which identifies the key as a valid key. The manufacturer's code is a factory programmed non-ASCII code used to identify a key which has been supplied by the impact monitoring device's manufacturer such that a third party cannot bypass the manufacturer and supply keys to the customer without knowing the code. The code is the result of a proprietary manipulation of each key's unique 6 byte serial number such that the code will be different on each key and cannot be copied.

Similarly to the first embodiment, a programming key in the form of a digital storage key similar to the disarming key 75 is provided for communication with the operator interface 32. The programming key has data stored thereon which is required for the microprocessor's program including the type identification number and the manufacturer's code. The data includes such values as a hard impact threshold, a soft impact threshold, a sampling number for each threshold, a lift delay time constant and an autoreset time constant, all of which are to be described in the following.

The autoreset time constant is a value of time used in an autoreset routine which automatically restarts the microprocessor program after an alarm state has been activated and the autoreset time constant has elapsed. The autoreset routine must be enabled in order to restart the microprocessor.

When an alarm state has been activated, the microprocessor's memory is flagged and the event data is recorded onto the black box key. If the autoreset routine is enabled the event data is recorded on a history buffer which holds up to 42 events. The alarm state will be deactivated once the autoreset time constant has elapsed. When a disarm key is detected on the operator interface, the history buffer is downloaded onto the key. When the autoreset routine is disabled the disarm key functions similarly to the first embodiment for deactivating the alarm state. The programming key also controls the enabling of the autoreset routine in addition to the autoreset time constant for use when the routine is enabled.

The lift delay time constant is a value of time which is programmable from 0–15 seconds. The lift delay time constant is used by a delay routine stored in the microprocessor and determines the amount of time after the vehicle has been started in which the lift solenoid remains operable whatever the status of the alarm. The lift delay time constant is used in case of an emergency and a few seconds of vehicle use is required to remove someone from danger.

The hard and soft impact thresholds are used in a sampling process which determines if an impact signal will activate the alarm state or not. The sampling process is repeated continuously to provide a sample every 5 milliseconds. Each 5 ms sample involves 20 cycles of 4 consecutive readings. Within each set of 4 readings, the highest and lowest readings are discarded such that 40 readings are remaining after the 20 cycles are completed. The 40 readings are averaged into a single sample which is produced every 5 ms. The samples are further processed by the microprocessor to determine if either a hard or a soft impact has occurred.

Figure 5:
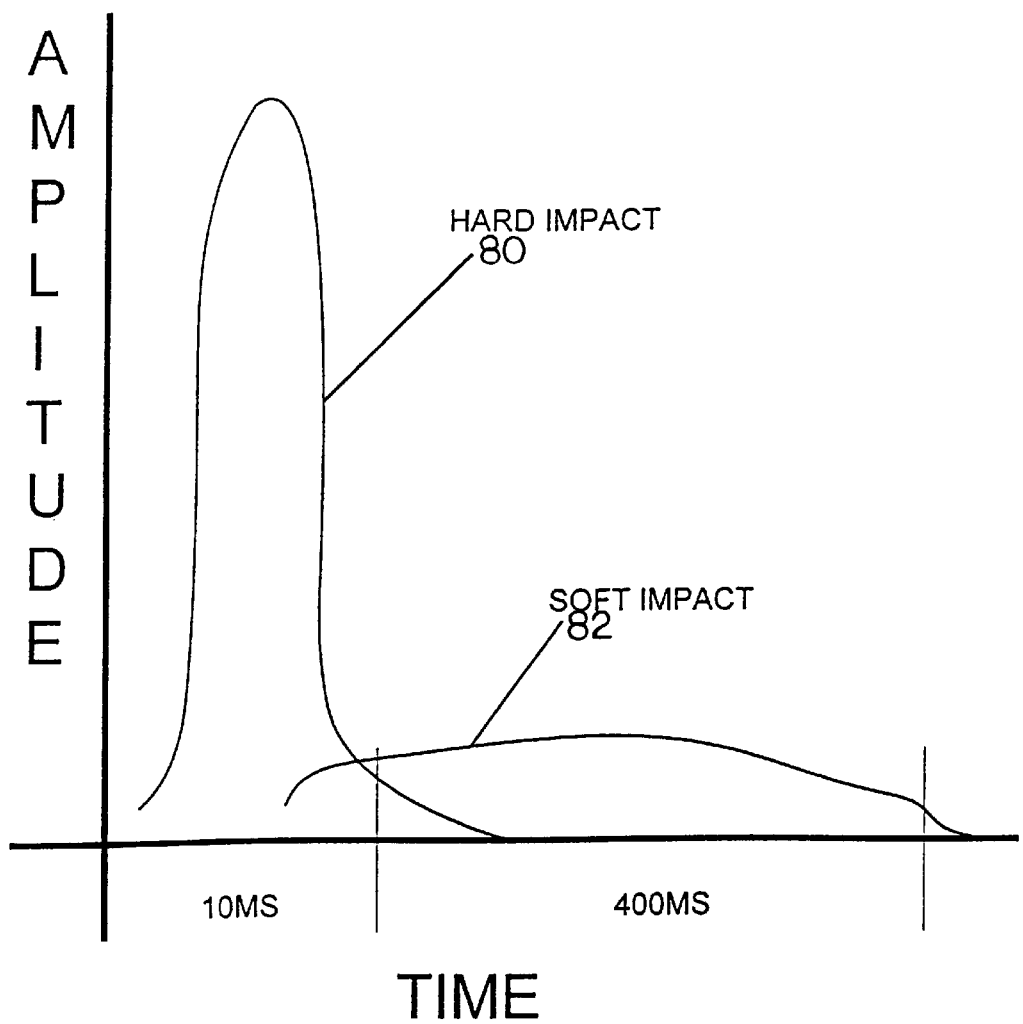
FIG. 5 is a graph showing the relative magnitude between a hard and soft impact acceleration over time.

As shown in FIG. 5, a hard impact 80 is an acceleration which is relatively short in duration and high in magnitude resulting from an impact with a solid object. The vehicle's energy is dissipated quickly in a hard impact. A soft impact 82 is an acceleration which is relatively long in duration and small in magnitude resulting from an impact with a deformable object. The vehicle's energy is dissipated slowly in a soft impact. The graph of hard and soft impact curves displays the accelerometer's output showing how the vehicle's energy is dissipated over time. In reality however, vibration and low frequency sound are also picked up by the accelerometer and the curves are not as smooth.

Figure 6:
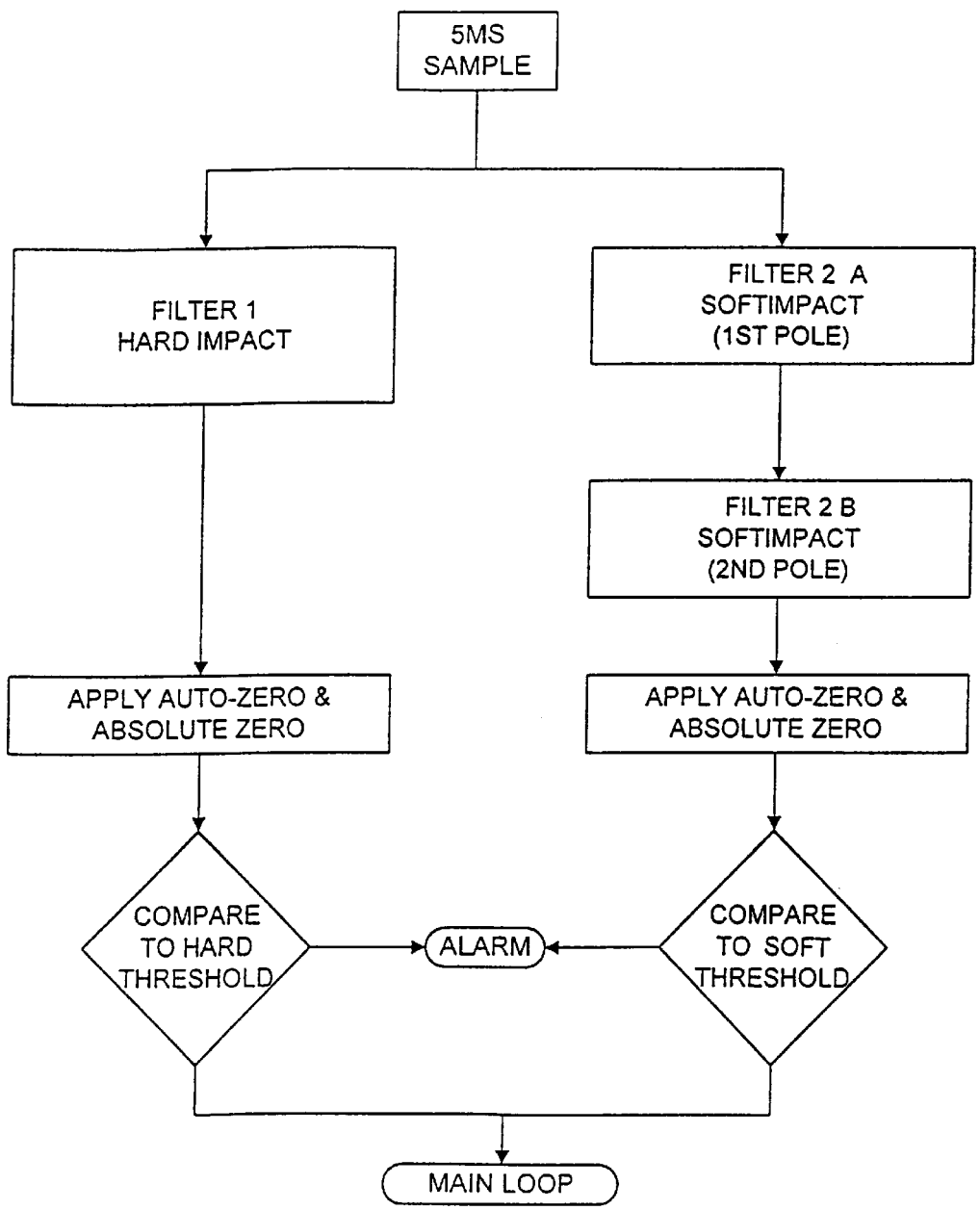
FIG. 6 is a schematic of a process used to determine if the vehicle has incurred a hard impact or a soft impact.

A process shown schematically in FIG. 6 determines if a given 5 ms sample exceeds either the hard or soft impact threshold values which are predetermined values received from the programming key. The result of each 5 ms sample undergoes both a hard impact routine and a soft impact routine as described below.

In order to determine if the vehicle has incurred a hard impact, a calculated average is compared to the hard impact threshold value transmitted from the program key and stored in the microprocessor. The calculated hard impact average is calculated using the following formula in which 'n' is the number of consecutive samples which is a predetermined variable programmed into the microprocessor:

$$\frac{(OldAverage * n) + NewSample}{(n+1)}$$

The default setting for the value of 'n' is 1 and 'OldAverage' represents the last calculated average. The formula acts similarly to an RC filter to further filter out sound and vibration noise. The output of the above formula is adjusted by an autozero routine and then the absolute value of the resulting average is compared to the hard impact threshold value. If the average is greater than the hard impact threshold value then the microprocessor will activate the alarm state.

In order to determine if the vehicle has incurred a soft impact, a calculated average is compared to the soft impact threshold value transmitted from the program key and stored in the microprocessor. The calculated soft impact average is calculated using the following formula in which 'm' is the number of consecutive samples which is a predetermined variable programmed into the microprocessor:

$$\frac{(OldAverage * m) + NewSample}{(m+1)}$$

The default setting for the value of 'm' is 7, however this value can be adjusted. The variable 'OldAverage' represents the previously calculated average of the above formula. The results of the above calculation are recalculated a second time using the same formula such that the routine acts as a two pole filter. The output of the recalculation is adjusted by the autozero routine and then the absolute value is compared to the soft impact threshold value. If the resulting average is greater than the soft impact threshold value than the microprocessor activates the alarm state.

The accelerometer output is between 0 and 3.4 volts centred at 1.7 volts as in the first embodiment, while the A/D converter output is 0 to 255 counts centred at 128 counts. A zero G acceleration is ideally 128 counts; however, due to component ageing this value must be recalibrated by the autozero routine. The autozero routine uses the same formula as for the calculation of the soft impact average with the value of 'm' being set at 255. This is similar to a very long time constant RC filter.

A recording key which is a digital storage key similar to the disarming key 75 is provided. The recording key communicates with the operator interface 32 for downloading sampling data from the microprocessor for further engineering analysis when downloaded again onto a computer. The recording key is capable of storing up to 7 impact events on each key of 40 samples per event. The key records the last impact event and deactivates the alarm state similarly to the disarm key.

The circuitry of the second embodiment is similar to that of the first embodiment, having a microprocessor 60, a PROM 68 and an address decoder 69 for storing and executing the programming of the device.

Figure 7A:
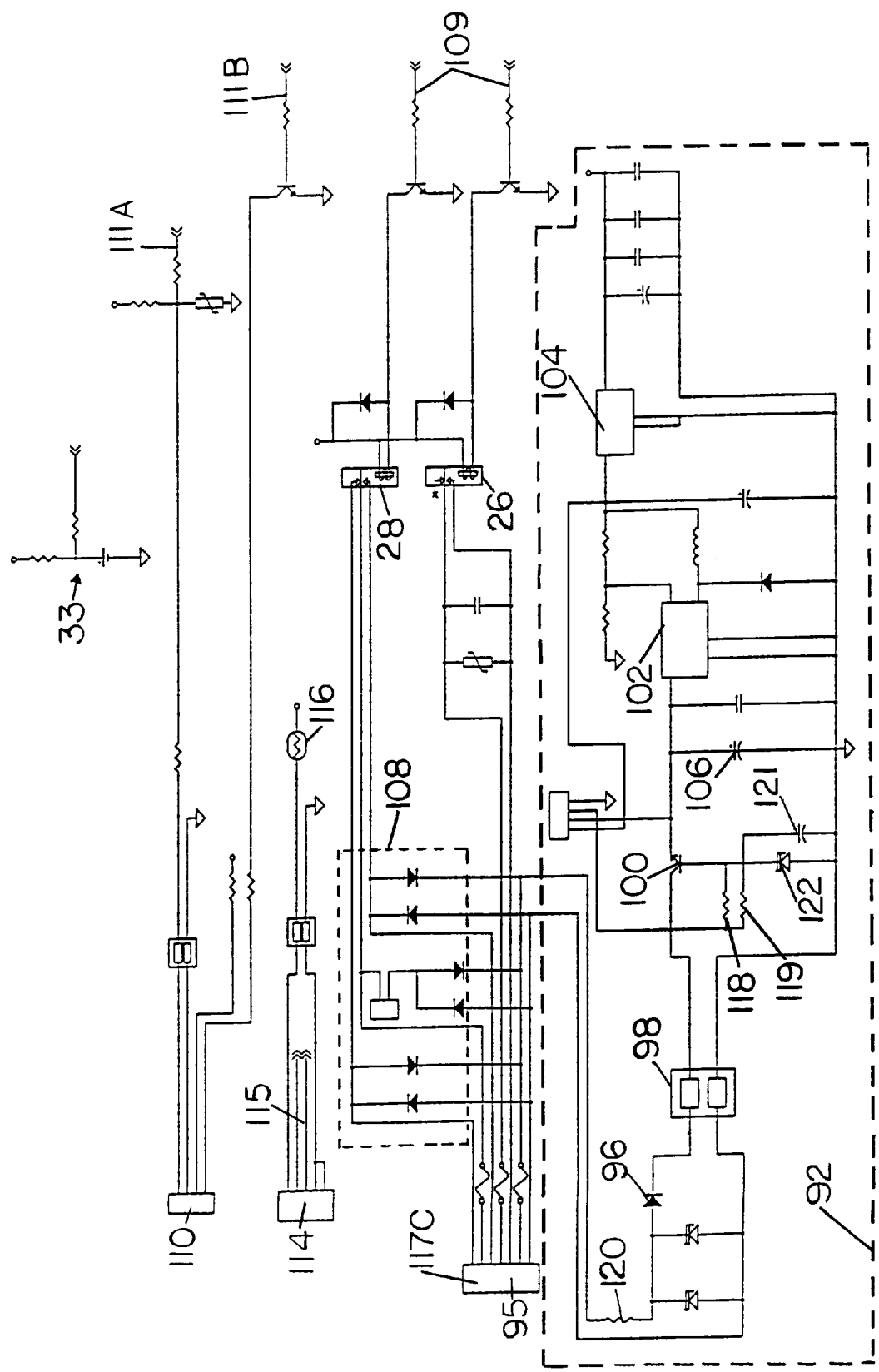
FIG. 7A is a schematic of a power circuit for the second embodiment.

A power supply circuit 92 of the second embodiment is shown in FIG. 7A. The power supply is connected to the vehicle's battery at terminals 95 and protected from reverse hook up by diode 96. Ferrite filters 98 are included in the circuit 92 and remove high frequency noise components generated in the vehicle's motors and relays, etc. The input voltage range is from 10 to 60 volts DC. A transistor 100, a switching voltage regulator 102 and a linear voltage regulator 104 serve to step the voltage down in stages. When voltage dropouts occur due to starting lift motors, capacitor 106 provides fill in power. The transistor 100 drops the voltage down to about 32 volts at its emitter.

Transient protection is provided to the relays 26 and 28 by diodes 108 which form a rectifier. The relays are controlled by terminals 109 which connect to the microprocessor of the second embodiment.

The key contacts of the interface 32 and the LED 34 of the second embodiment are connected to the circuit by header 110 for communicating to the microprocessor through respective terminals 111a and 111b.

Figure 7B:
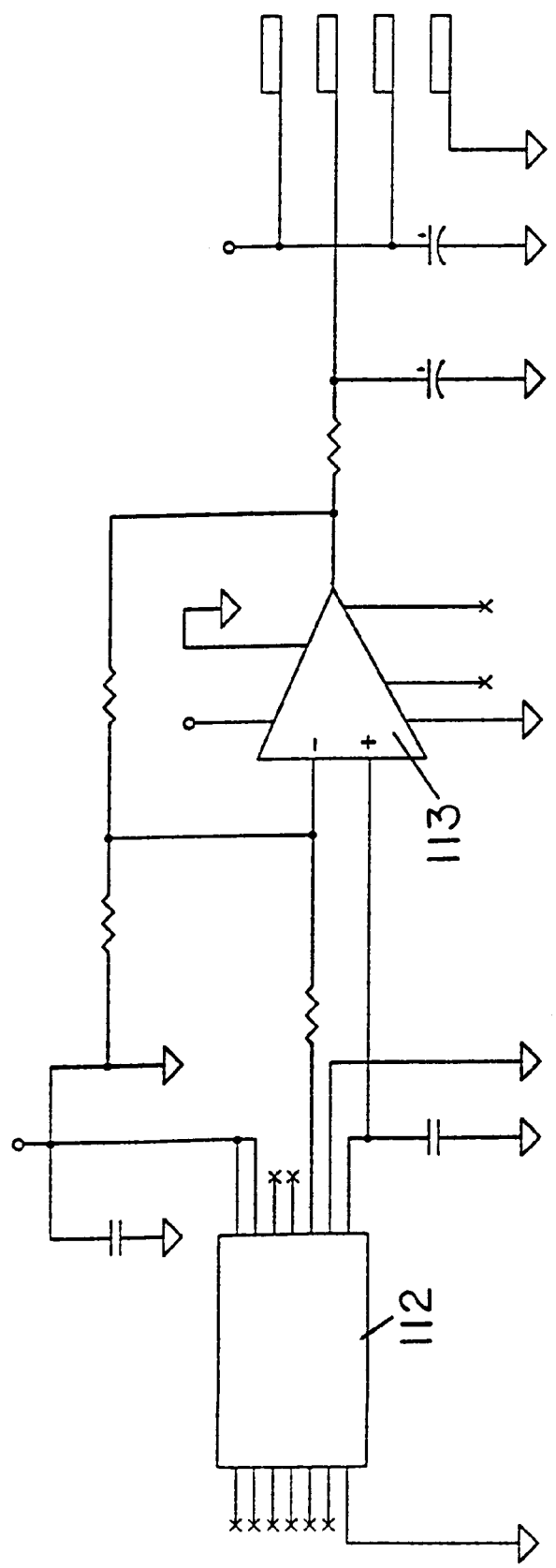
FIG. 7B is a schematic of the accelerometer circuit of the second embodiment.

The accelerometer and associated circuitry which is mounted remotely from the main housing of the device is shown in FIG. 7B. The accelerometer chip is identified by reference numeral 112 and an amplifier is indicated at 113. The reference voltage for the chip is 3.4 volts. The output at P2 is set to half of the reference voltage at 1.7 volts. This allows the output to swing up to 3.4 volts or down to 0 volts for either acceleration or deceleration which equates to accelerations or decelerations of up to 11 G's. The output lines P1 through P4 of the accelerometer's associated circuitry is connected to header 114 of FIG. 7A for communicating with the microprocessor through terminals 115. The circuitry is DC coupled from the accelerometer to the microprocessor and protected from transient signals by the polyswitch 116.

Figure 7C:
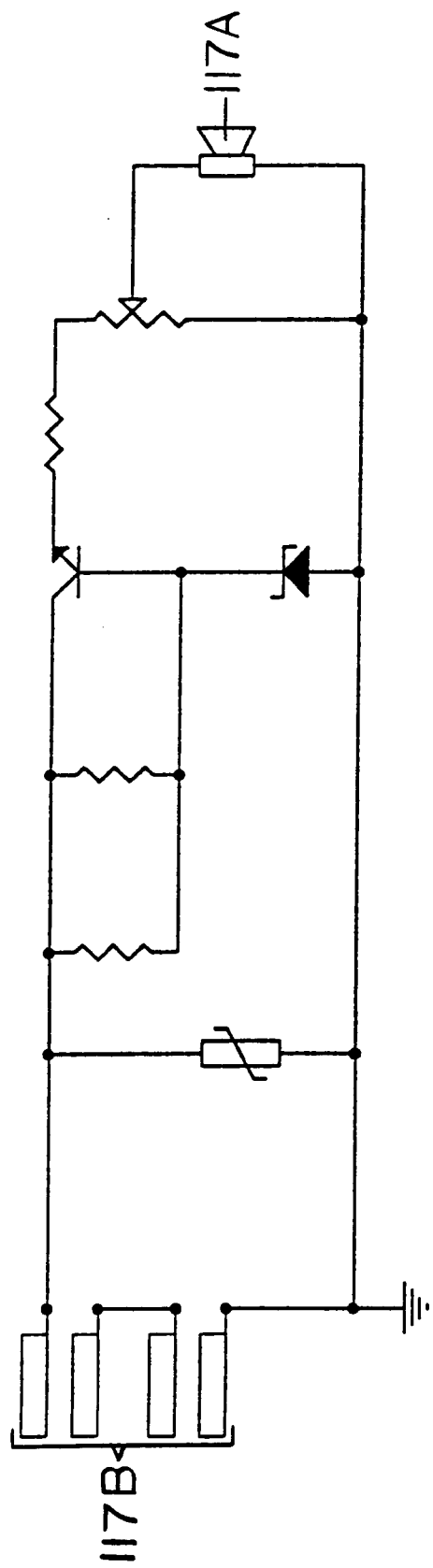
FIG. 7C is a schematic of an auxiliary horn module for the second embodiment.

FIG. 7C shows an auxiliary horn module which provides a back up horn 117a connected to the circuitry for use in connection with the horn relay 26 instead of the vehicle's horn. The auxiliary horn module connects at terminals 117b to the horn contacts 117c shown in FIG. 7A in place of the vehicle's horn contacts. The auxiliary horn module provides an internal horn for generating an alarm sound without relying upon the vehicle's horn to be in operation.

Figure 8:
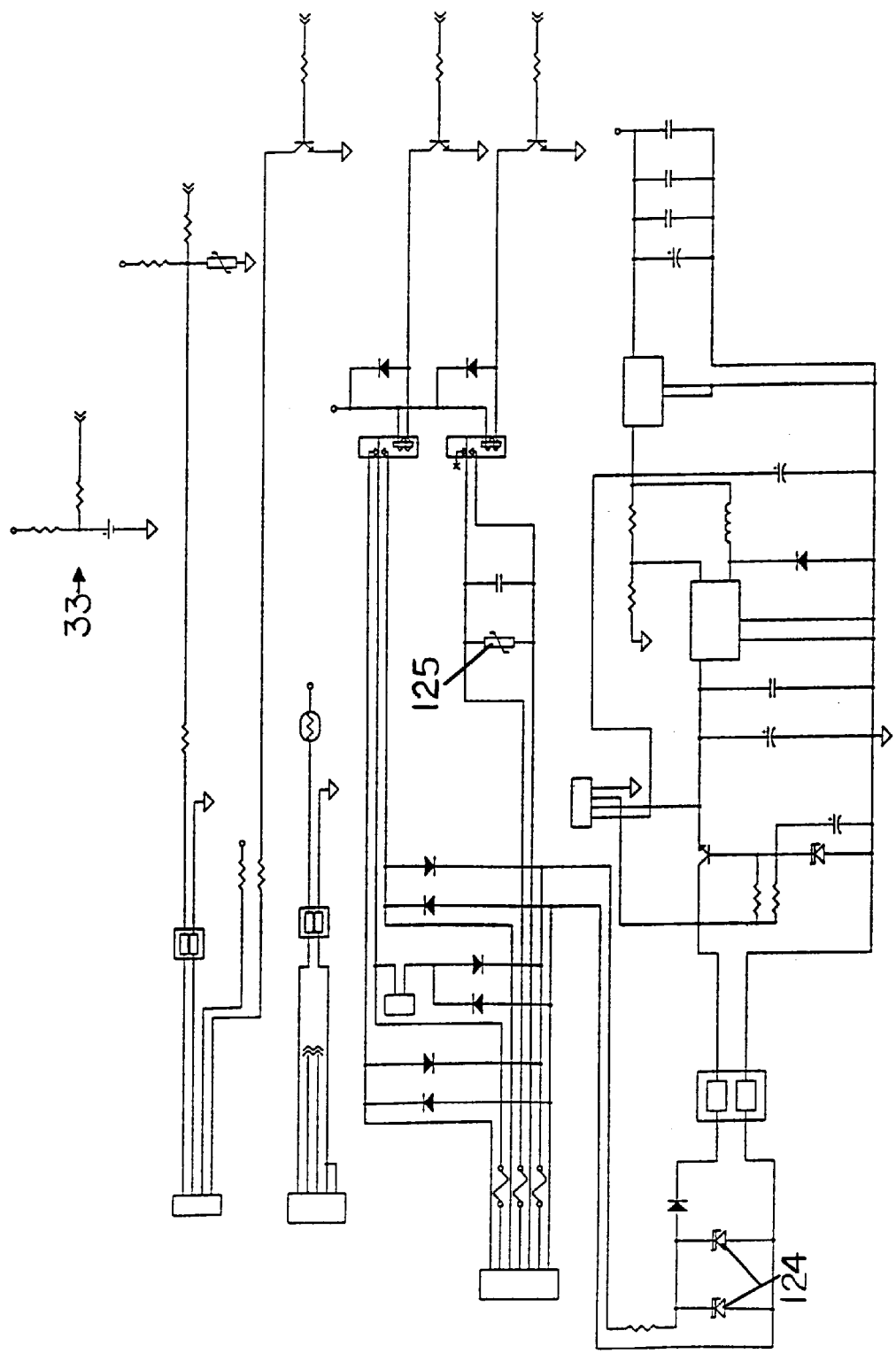
FIG. 8 is a schematic of an alternative power circuit for the second embodiment.

In FIG. 8, an alternative arrangement of the power supply circuit is shown designed specifically for a 12 volt power source. The transistor 100 of FIG. 7A as well as resistors 118, 119 and 120, also of FIG. 7A are shown removed in the alternative arrangement. Also, capacitor 121 and diode 122 are removed. Diodes 124 and VR 125 are modified versions of FIG. 7A.

Figure 9:
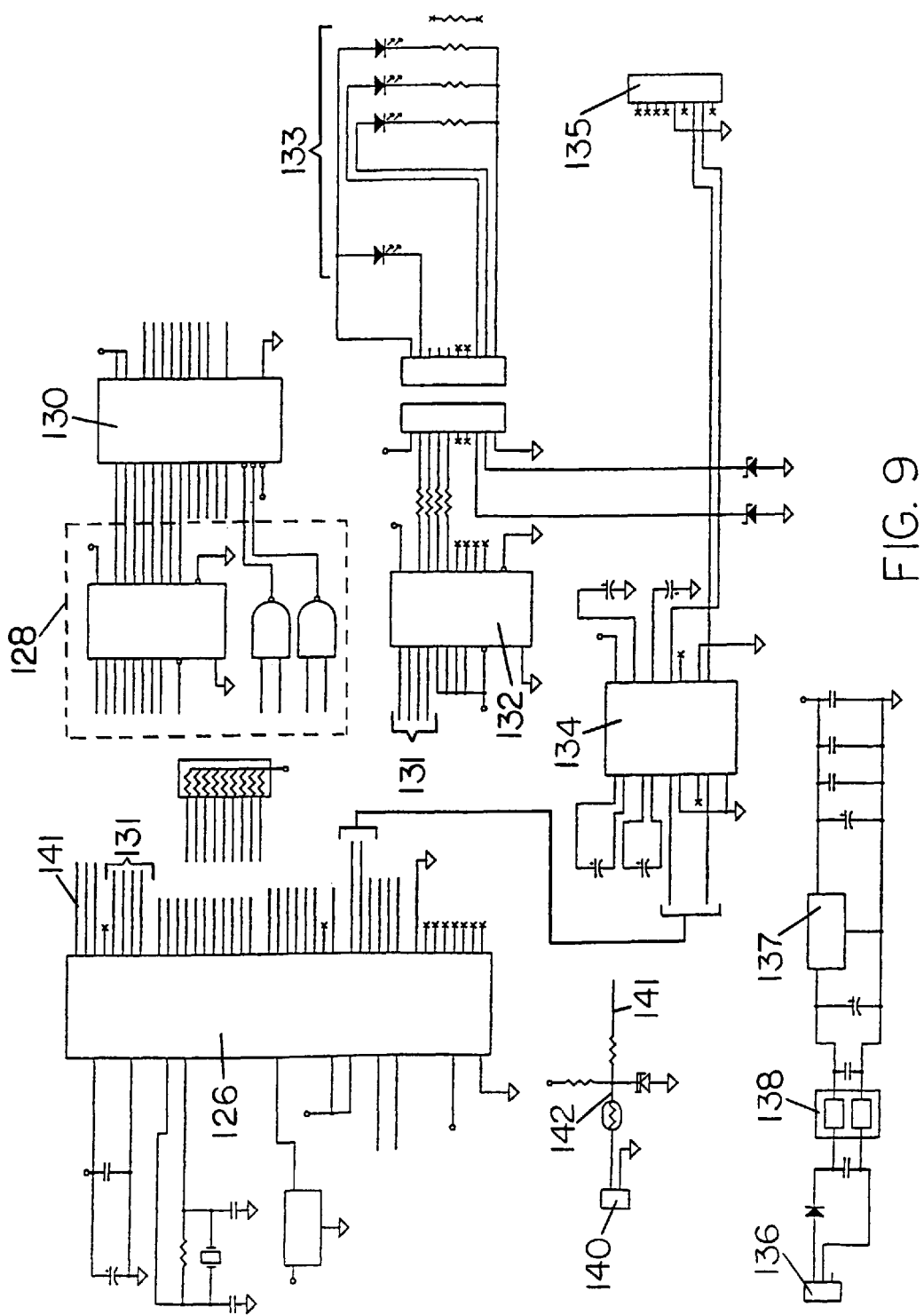
FIG. 9 is a schematic of a key interface circuit arranged to connect to a computer.

In FIG. 9, the circuitry for the key interface communication unit 78 is shown schematically. A microprocessor 126 is shown for controlling the operation of the key interface communication unit. An address decoder 128 and an external programmable read only memory (EPROM) 130 are also provided for storing the programming of the interface. The microprocessor 126 is connected to the address decoder and the EPROM for executing the programming stored thereon.

Terminals 131 connect an LED driver 132 to the microprocessor for activating light emitting diodes (LED) 133 corresponding to reading, writing as well as key contact and power status indicators on the interface 78. D7 is an LED which indicates that the power is turned on. D6 is a diode which is arranged to flash when data is transmitted to the computer. D5 is a diode which is arranged to flash when data is received from the computer.

An interface 134 connects between the microprocessor and the computer through a serial port 135. A power circuit for the interface 78 is connected to a wall transformer at header 136 and includes a voltage regulator 137 and ferrite filter 138 for supplying 5V power to the rest of the circuit.

Header 140 connects to the contacts which read the digital storage keys and transmit the signal to the microprocessor through terminal 141. An input protection circuit 142 protects the circuitry of the key interface communication unit from the key contacts and includes a polyswitch similar to those described previously. The circuitry is mounted within a housing with the LED's and the key contacts being visibly mounted on a top side of the housing.

Figure 10:
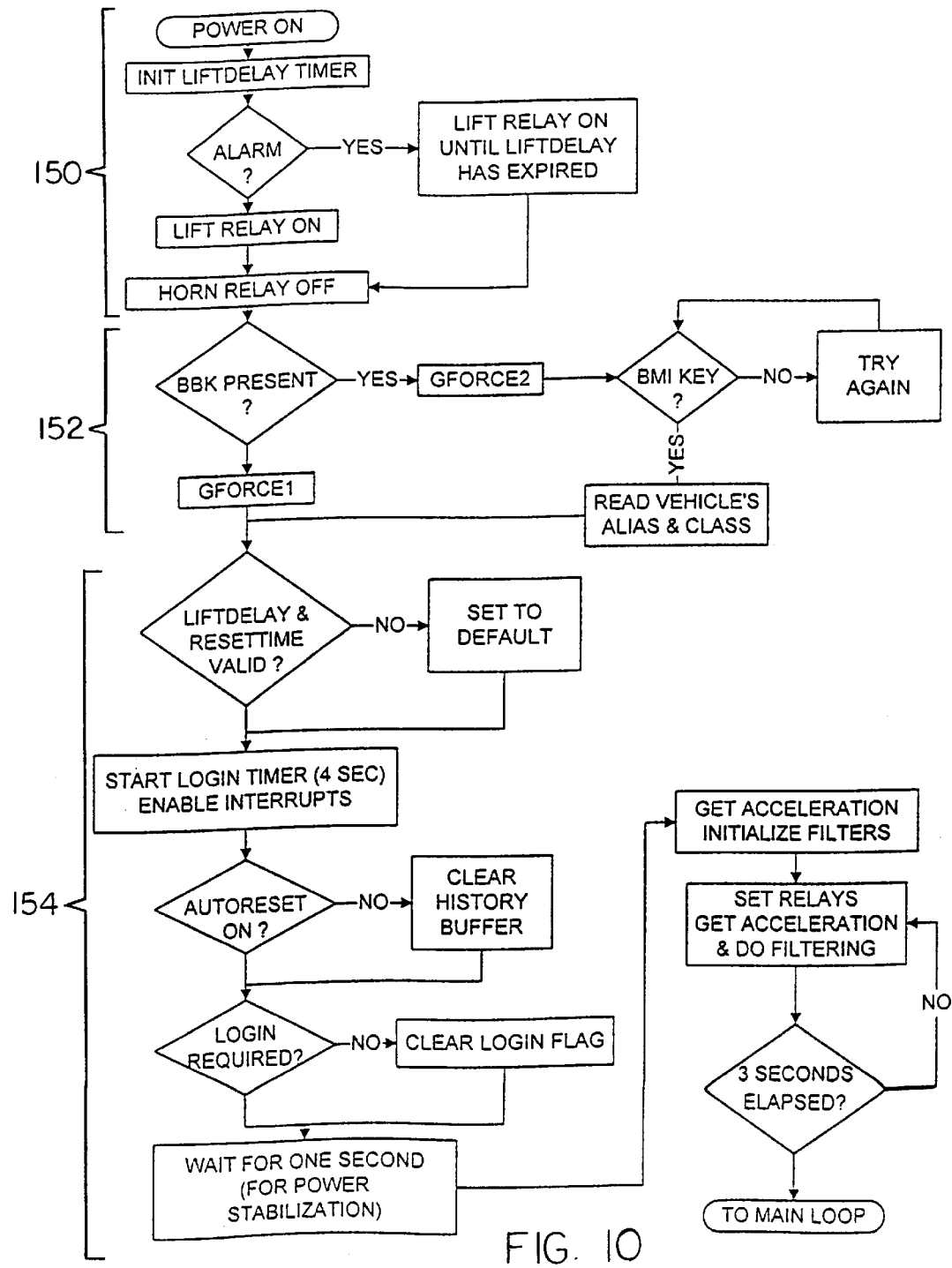
FIGS. 10, 11, 12A and 12B are schematics of flowcharts for respective Initialisation, Main Loop and Interrupt Routine processes of the program for the second embodiment of the device.

The impact monitoring device is programmed to execute a program illustrated as a flow chart in FIGS. 10 through 12A and 12B. When the device is first turned on upon vehicle start up, an initialisation routine, shown in FIG. 10, is initiated. The program performs a lift check 150 for determining if the lift relay is to be open or closed once the lift delay timer has expired. A black box key check 152 then determines if a black box key is present and applies a routine appropriate to either the first or second mode of operation. Once the mode has been determined, all the required values and flags are checked at 154. This includes checking the autoreset routine, operator login, first and second relay status, and initial acceleration data before proceeding to the main loop of the program.

Figure 11:
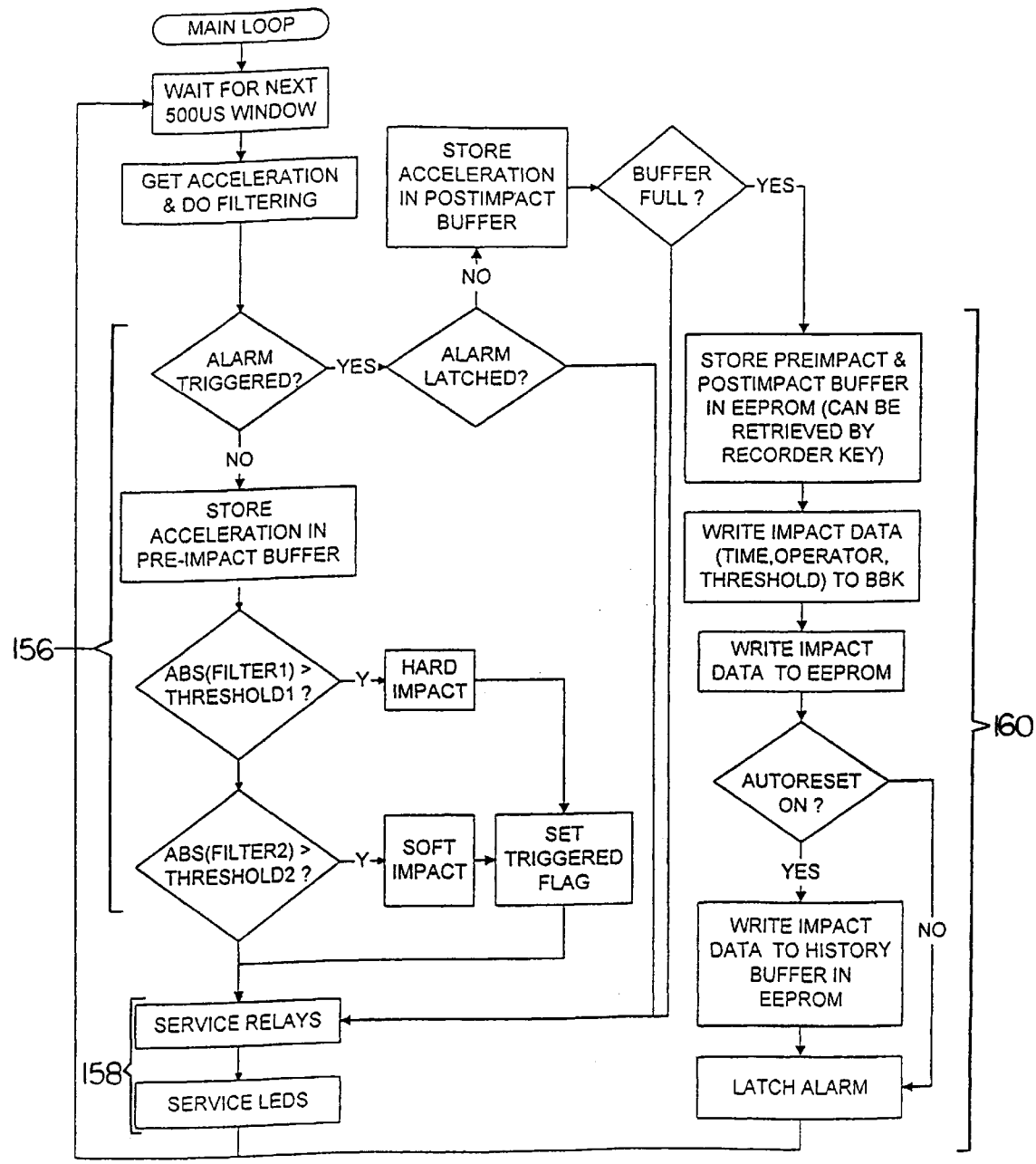

The main loop of the program, shown schematically in FIG. 11, is a loop which is repeated over and over while the device is operating. At the beginning of each loop, acceleration data is retrieved from the accelerometer and filtered before an alarm check 156 is performed to determined if the impact thresholds have been exceeded. The status of the relays and LED's at 158 are then updated. A storing routine 160 is also included for storing the acceleration data appropriately. The main loop is continuously repeated unless an interrupt routine is activated.

Figure 12A:
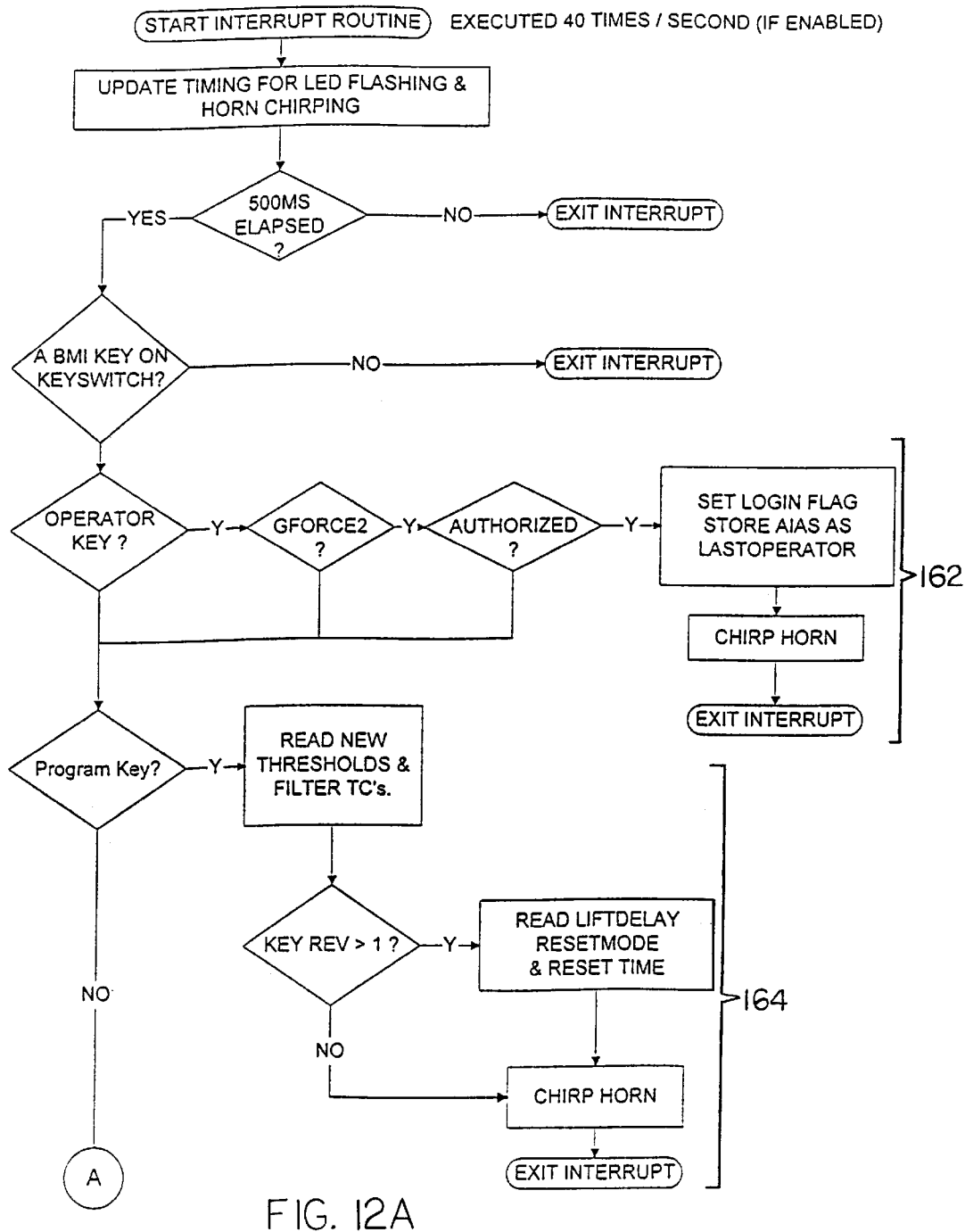
Figure 12B:
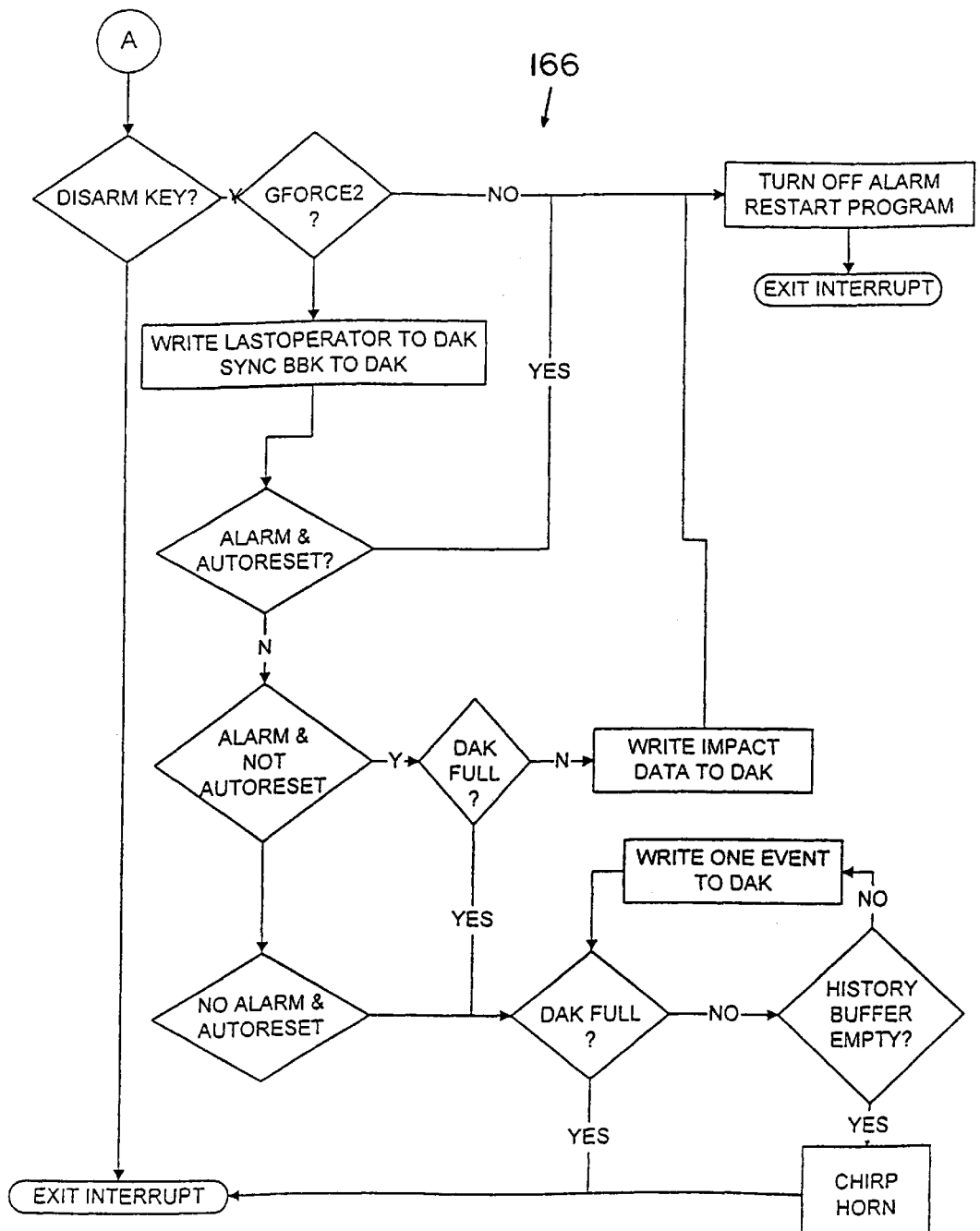

The interrupt routine, illustrated schematically in FIGS. 12A and 12B, is executed 40 times per second if enabled to check for the presence of a Dallas touch memory key. Once a valid key has been detected on the key contacts, an operator key routine 162, a program key routine 164, or a disarm key routine 166 is performed. Each routine assigns values to appropriate variables and transmits appropriate information depending upon which type of key has been detected.

While two embodiments of the present invention have been described in the foregoing, it is to be understood that other embodiments are possible within the scope of the invention. The invention is to be considered limited solely by the scope of the appended claims.

What is claimed is:

1. An impact monitoring device for mounting on a lift vehicle having a lift mechanism for monitoring impacts the vehicle incurs, the device comprising:
   an impact sensing element arranged to produce an impact signal in response to an acceleration condition incurred by the vehicle which is outside of a range of acceleration conditions, the impact signal representing the acceleration condition;
   a processor connected to the impact sensing element and including;
      an alarm activator for activating an alarm state in response to receipt by the processor of an impact signal from the impact sensing element;
      an alarm latch for latching the alarm state; and
      an alarm release for releasing the alarm in response to receipt by the processor of a disarming signal;
   an operator interface mounted on the vehicle, the operator interface being arranged for receiving the disarming signal and transmitting the disarming signal to the alarm release; and
   a disabling element for disabling the lift mechanism of the vehicle during the alarm state.

2. The device according to claim 1 wherein there is provided a horn relay connected to the processor, the horn relay being activated by the processor during the alarm state for sounding the horn.

3. The device according to claim 2 wherein there is provided a relay monitor connected to the horn relay, the relay monitor being arranged to activate the alarm state if the horn circuit is disconnected.

4. The device according to claim 1 wherein the lift mechanism includes a lift solenoid and the disabling element comprises a disabling circuit coupled to the lift solenoid for disabling the lift solenoid during the alarm state.

5. The device according to claim 1 wherein there is provided a power circuit arranged to be connected to the processor for supplying continuous power to the processor.

6. The device according to claim 5 wherein there is provided a power circuit monitor connected to the processor arranged to activate the alarm state and interrupt power to the lift mechanism in response to an absence of power to the processor if the power circuit of the processor is disconnected.

7. The device according to claim 1 wherein there is provided a memory element connected to the processor, the memory element being arranged to store impact signals thereon.

8. The device according to claim 7 wherein there is provided a vehicle identification element connected to the microprocessor, the vehicle identification element being arranged to store an identification of the vehicle in the memory element with each impact signal.

9. The device according to claim 7 wherein there is provided a clock element connected to the memory element, the clock element being arranged to store a time corresponding to each impact signal in the memory element.

10. The device according to claim 1 wherein there is provided an alarm delaying element for delaying activation of the alarm state for a predetermined amount of time following vehicle start up such that the vehicle is momentarily operable upon start up.

11. The device according to claim 1 wherein there is provided a disarming digital storage element having the disarming signal stored thereon and being arranged to contact the operator interface for communicating therewith, the disarming digital storage element having a coded element therein such that the disarming signal stored on the disarming digital storage element cannot be duplicated by unauthorised persons.

12. The device according to claim 11 wherein the disarming digital storage element has a memory element therein for recording and storing data in the form of impact signals thereon when the disarming digital storage element communicates with the operator interface for transmitting the disarming signal thereto.

13. The device according to claim 12 wherein there is provided a computer interface arranged to communicate between the disarming digital storage element and a computer for storing the impact signals recorded on the disarming digital storage element into the computer.

14. The device according to claim 1 wherein there is provided an identification digital storage element having operator identification data recorded thereon, the identification digital storage element being arranged to communicate with the operator interface such that the operator identification data is stored with the impact signal when an alarm state is activated.

15. The device according to claim 1 wherein there is provided a threshold digital storage element having the range of acceleration conditions stored thereon for programming an impact threshold of the processor when engaged with the operator interface.

16. An impact monitoring device for mounting on a vehicle for monitoring impacts the vehicle incurs, the device comprising:
   an impact sensing element arranged to produce an impact signal in response to an acceleration condition incurred by the vehicle which is outside of a range of acceleration conditions, the impact signal representing the acceleration condition;
   a processor connected to the impact sensing element and including;
      an alarm activator for activating an alarm state in response to receipt by the processor of an impact signal from the impact sensing element;
      an alarm latch for latching the alarm state; and
      an alarm release for releasing the alarm state in response to receipt by the processor of a disarming signal;
   an operator interface mounted on the vehicle, the operator interface being arranged for receiving the disarming signal and transmitting the disarming signal to the alarm release; and
   an identification digital storage element having operator identification data stored thereon, the identification digital storage element being arranged to communicate with the processor such that the operator identification data is recorded with the impact signal when an alarm state is activated.

17. A method of monitoring impacts incurred by a vehicle, said method comprising;
- providing an impact sensing element mounted on the vehicle, the impact sensing element being arranged to produce an impact signal representing a magnitude of acceleration incurred by the vehicle at a given point in time;
- providing microprocessor means for processing a plurality of impact signals;
- calculating a sample representative of at least one impact signal;
- calculating a hard impact average of at least two consecutive samples;
- comparing the hard impact average to a predetermined hard impact value;
- activating an alarm state if the hard impact average exceeds the predetermined hard impact value;
- calculating a soft impact average of a greater number of consecutive samples than the hard impact average;
- comparing the soft impact average to a predetermined soft impact value which is less in magnitude than the hard impact value; and
- activating the alarm state if the soft impact average exceeds the predetermined soft impact value.

18. The method according to claim 17 comprising calibrating the impact sensing element after each hard and soft impact averages are calculated.

19. The method according to claim 17 comprising recalculating the soft impact average before comparing the soft impact average to the predetermined soft impact value for reducing the possibility of an incorrect soft impact average activating the alarm state.

20. An impact monitoring device for mounting on a vehicle for monitoring impacts the vehicle incurs, the device comprising:
- an impact sensing element arranged to produce an impact signal in response to an acceleration condition incurred by the vehicle which is outside of a range of acceleration conditions, the impact signal representing the acceleration condition;
- a processor connected to the impact sensing element and including:
    - an alarm activator for activating an alarm state in response to receipt by the processor of an impact signal from the impact sensing element;
    - an alarm latch for latching the alarm state; and
    - an alarm release for releasing the alarm in response to receipt by the processor of a disarming signal;
- an operator interface mounted on the vehicle, the operator interface being arranged for receiving the disarming signal and transmitting the disarming signal to the alarm release;
- a disabling element for disabling a function of the vehicle during the alarm state; and
- an alarm delaying element for delaying activation of the alarm state for a predetermined amount of time following vehicle start up such that the vehicle is momentarily operable upon start up.

* * * * *